(12) United States Patent
Nishikawa

(10) Patent No.: US 11,403,046 B2
(45) Date of Patent: Aug. 2, 2022

(54) MANAGEMENT DEVICE, METHOD, AND PROGRAM STORAGE MEDIUM

(71) Applicant: CANON KABUSHIKI KAISHA, Tokyo (JP)

(72) Inventor: Satoshi Nishikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/167,021

(22) Filed: Feb. 3, 2021

(65) Prior Publication Data

US 2021/0255812 A1 Aug. 19, 2021

(30) Foreign Application Priority Data

Feb. 17, 2020 (JP) .............................. JP2020-024616

(51) Int. Cl.
*G06F 3/12* (2006.01)
(52) U.S. Cl.
CPC ............ *G06F 3/1204* (2013.01); *G06F 3/123* (2013.01); *G06F 3/1231* (2013.01); *G06F 3/1257* (2013.01); *G06F 3/1296* (2013.01)
(58) Field of Classification Search
None
See application file for complete search history.

(56) References Cited

U.S. PATENT DOCUMENTS

| | | | |
|---|---|---|---|
| 2008/0244057 A1* | 10/2008 | Kojima | H04L 67/34 709/223 |
| 2018/0123676 A1* | 5/2018 | Kawabata | H04B 7/14 |
| 2019/0373130 A1* | 12/2019 | Han | G06F 8/62 |

FOREIGN PATENT DOCUMENTS

JP 2016062350 A 4/2016

* cited by examiner

*Primary Examiner* — Frantz Bataille
(74) *Attorney, Agent, or Firm* — Rossi, Kimms & McDowell LLP

(57) ABSTRACT

A management device that manages an image processing device via a network includes a first acquisition unit acquiring application information for each application which is installed in the image processing device; a creation unit creating a task for monitoring an operation of an application in the image processing device; and a second acquisition unit acquiring resource information on resources which are required for using an application in the image processing device in accordance with the created task. An instruction on processing of a second type of application installed in the image processing device is executed when the acquired resource information satisfies predetermined conditions.

12 Claims, 22 Drawing Sheets

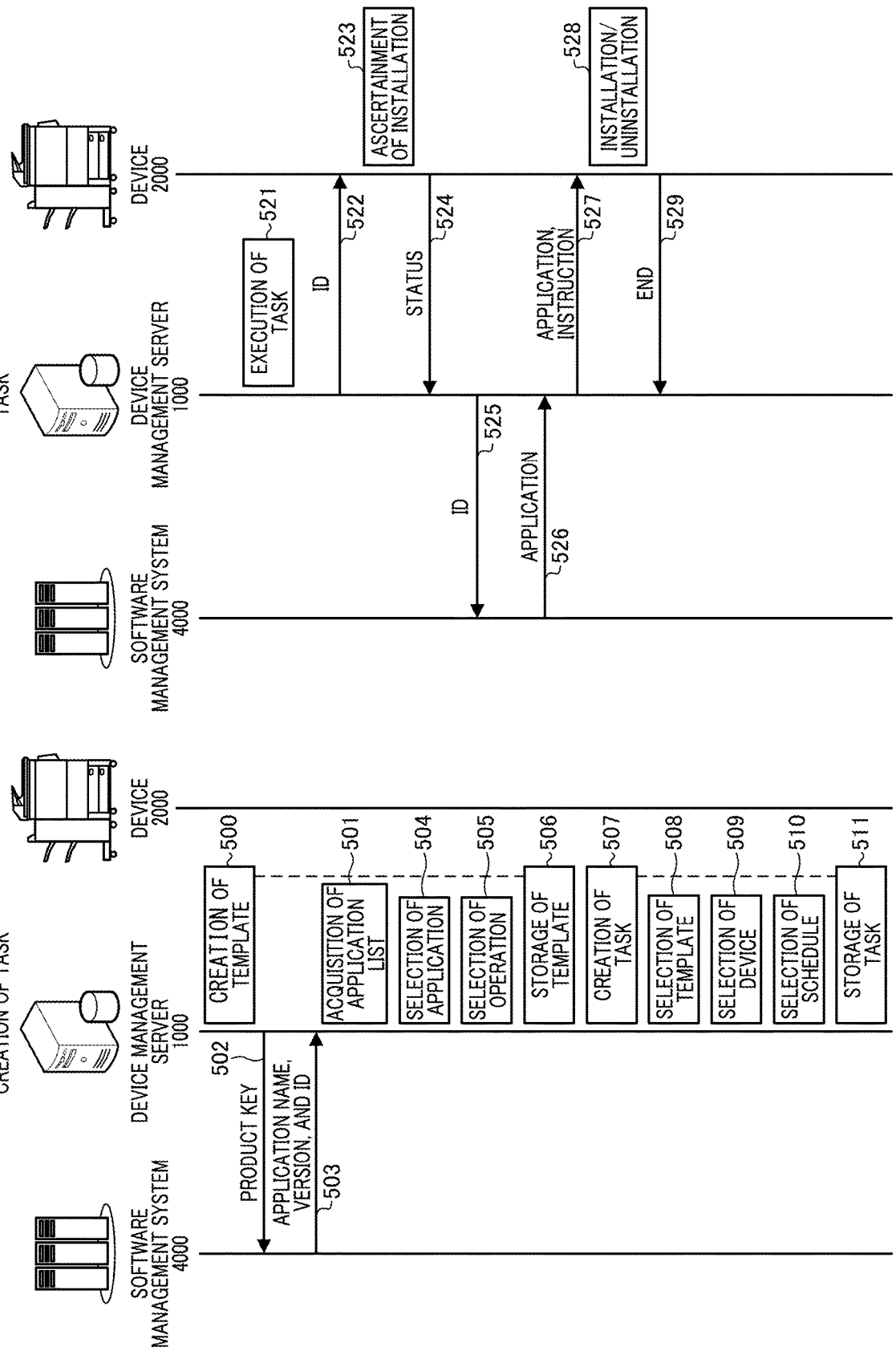

FIG. 6A

```
CREATION OF TEMPLATE                                        ×

TEMPLATE NAME   | INSTALLATION A |
                                              ┌──────────────┐
    PRODUCT KEY     |    xxxxxx      |        │ ACQUISITION OF│
                                              │  INFORMATION │
                                              └──────────────┘

APPLICATION NAME    VERSION        ID
    ☐    APPLICATION B      1.0         1001
    ☐    APPLICATION B      1.1         1002

[ TO NEXT ]
```

FIG. 6B

```
CREATION OF TEMPLATE                                        ×

TEMPLATE NAME

| INSTALLATION TEMPLATE A  ▼ |
            | INSTALLATION TEMPLATE B    |
            | INSTALLATION TEMPLATE C    |

[ TO NEXT ]
```

FIG. 7A

| | DEVICE NAME | HOST NAME | IP ADDRESS | SERIAL NUMBER |
|---|---|---|---|---|
| ☐ | iR 2200 | caNOn21 | 192.168.10.87 | 18993354 |
| ☐ | iR 2300 | caNOn31 | 192.168.10.100 | 18993344 |
| ☐ | iR 2800 | caNOn44 | 192.168.10.110 | 189933643 |

SELECTION OF DEVICE ✕

SELECT ALL | RELEASE ALL

TO NEXT

FIG. 7B

SELECTION OF SCHEDULE ✕

SCHEDULE
● EXECUTE IMMEDIATELY
○ EXECUTE AT DESIGNATED DATE AND TIME
○ EXECUTE PERIODICALLY

RETURN | TO NEXT

FIG. 11

| CREATION OF TEMPLATE | ✕ |

TEMPLATE NAME   APPLICATION A

SELECTION OF DELETION

■ MANUAL

☐ AUTOMATIC

TO NEXT

FIG. 12

| CREATION OF TEMPLATE | ✕ |

TEMPLATE NAME    APPLICATION A

DELETION OBJECT
- ■ CHARGED/FREE
    - ■ CHARGED  ☐ FREE
- ☐ INSTALLATION MEANS
    - ☐ DEVICE MANAGEMENT SYSTEM  ☐ DEVICE PANEL
- ☐ ALL APPLICATIONS

TO NEXT

FIG. 13

```
┌─────────────────────────────────────────────────────┬───┐
│ CREATION OF TEMPLATE                                │ × │
├─────────────────────────────────────────────────────┴───┤
│                                                         │
│   TEMPLATE NAME   │ APPLICATION A │                     │
│                                                         │
│  ┌───────────────────────────────────────────────────┐  │
│  │  UNINSTALLATION TIMING                            │  │
│  │                                                   │  │
│  │   ☐  IMMEDIATELY                                  │  │
│  │                                                   │  │
│  │   ■  WHEN DEVICE IS SHUT DOWN                     │  │
│  │                                                   │  │
│  │   ☐  DESIGNATION OF DATE AND TIME                 │  │
│  │      YEAR, MONTH, DATE, HOUR, MINUTE              │  │
│  │                                                   │  │
│  └───────────────────────────────────────────────────┘  │
│                                                         │
│                                        │ TO NEXT │      │
└─────────────────────────────────────────────────────────┘
```

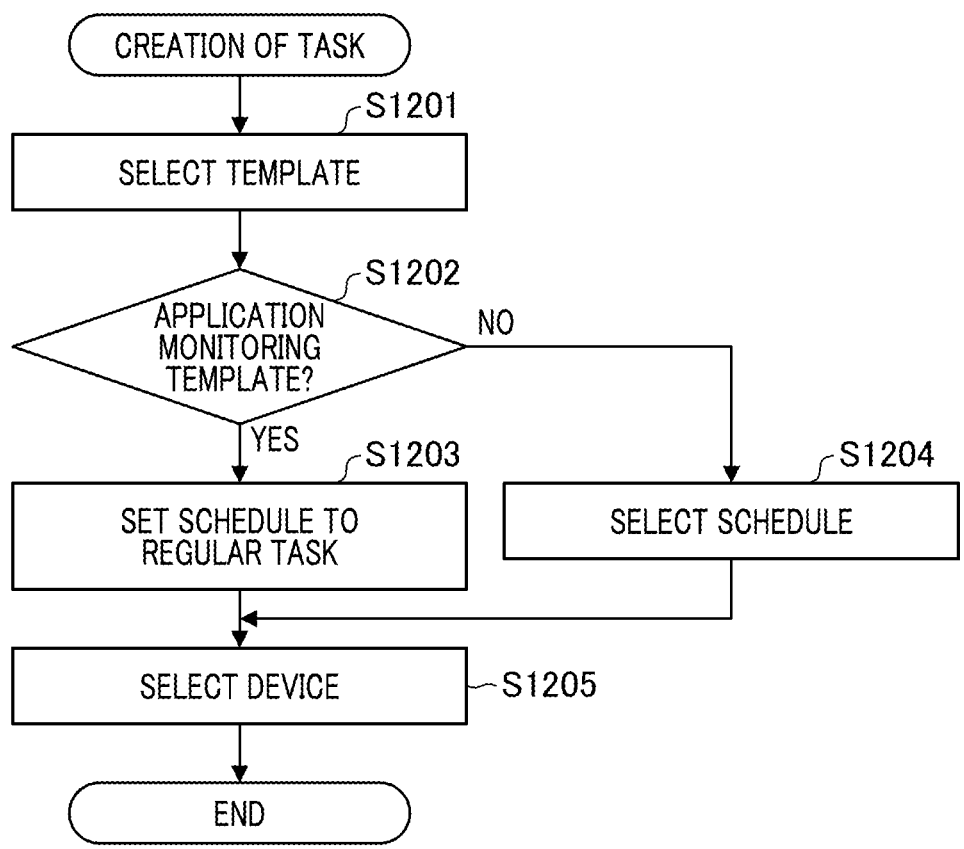

FIG. 22

| | APPLICATION NAME | VERSION | ID |
|---|---|---|---|
| ☐ | APPLICATION B | 2.0 | 1022 |
| ■ | APPLICATION C | 1.0 | 1078 |
| ☐ | APPLICATION D | 3.0 | 1002 |

SELECTION OF UNINSTALLATION APPLICATION  ✕

TO NEXT

MANAGEMENT DEVICE, METHOD, AND PROGRAM STORAGE MEDIUM

BACKGROUND OF THE INVENTION

Field of the Invention

The present invention relates to a management device, a method, and a program storage medium.

Description of the Related Art

In the related art, a device management system that acquires and manages data such as operation information of image processing devices such as printers or multifunction peripheral (hereinafter also referred to as devices) is known. Some management devices that manage devices via a network in such a type of management system have a function of delivering necessary applications to the devices and installing the applications in the devices.

For example, as described in Japanese Patent Laid-Open No. 2016-62350, installing a function-extensible application in a device and customizing the device has been performed in the related art.

Recently, an additional application can be simply installed in a device through a panel operation. Such an application which is installed in a device through the panel operation often has a lower degree of importance than an application which is delivered from a management device.

On the other hand, resources which are used to execute applications in a device are finite. In order to secure an operation environment of the device in which necessary applications can be executed, there is demand for a structure that appropriately manages operation states of applications including applications installed through the panel operation or resources of the device.

SUMMARY OF THE INVENTION

According to an embodiment of the present invention, there is provided a management device that manages an image processing device via a network. The image processing device is capable of installing a first type of application which is delivered from the management device and a second type of application which is of a type different from the first type. The management device includes: a memory storing instructions; and a processor executing the instructions to cause the management device to perform: acquiring application information for each of one or more applications which are installed in the image processing device; creating a task for monitoring an operation of an application in the image processing device; and acquiring resource information on resources which are required for using an application in the image processing device in accordance with the created task. An instruction on processing of the second type of application included in the one or more applications installed in the image processing device is executed when the acquired resource information satisfies predetermined conditions.

Further features of the present invention will become apparent from the following description of exemplary embodiments with reference to the attached drawings.

BRIEF DESCRIPTION OF THE DRAWINGS

FIG. 5 is a diagram illustrating an example of a sequence of a basic process routine which is performed by the device management system;

FIG. 6A is a diagram illustrating a display example of a template creation screen and FIG. 6B is a diagram illustrating a display example of a template selection screen;

FIG. 7A is a diagram illustrating a display example of a device selection screen and FIG. 7B is a diagram illustrating a display example of a schedule selection screen;

FIG. 11 is a diagram illustrating a display example of the template creation screen;

FIG. 12 is a diagram illustrating a display example of the template creation screen;

FIG. 13 is a diagram illustrating a display example of the template creation screen;

FIG. 17 is a flowchart illustrating an operation example at the time of creation of a task in the device management server according to the first embodiment;

FIG. 22 is a diagram illustrating a display example of the uninstallation application selection screen.

DESCRIPTION OF THE EMBODIMENTS

Hereinafter, embodiments of the invention will be described with reference to the accompanying drawings or the like. Not all features described in the following embodiments are essential for the invention.

First Embodiment

Figure 1:
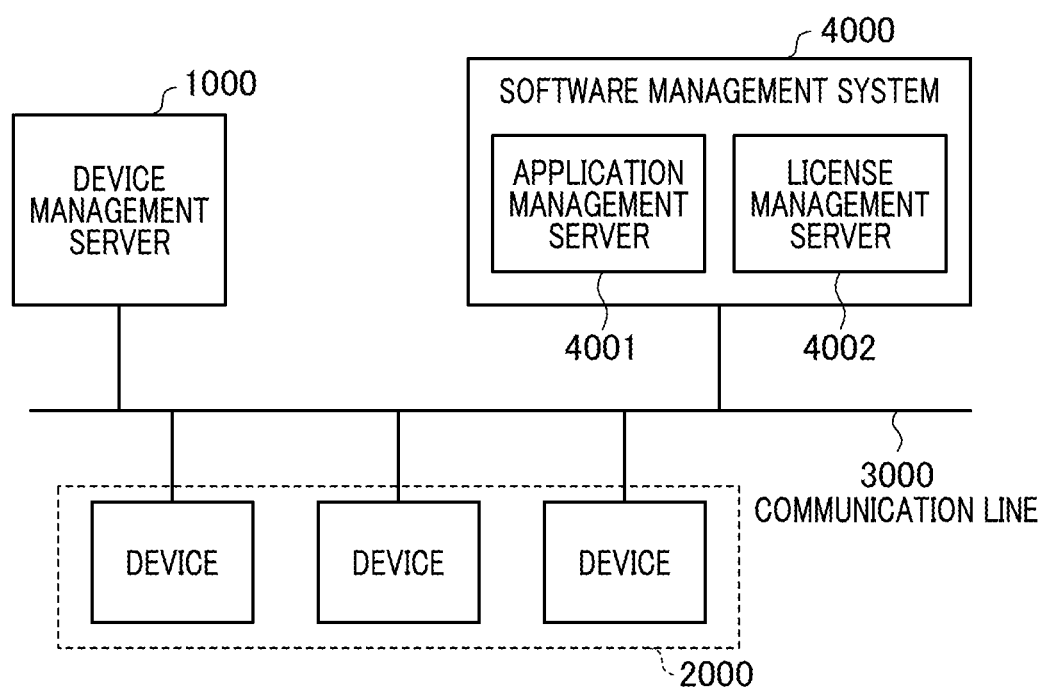
FIG. 1 is a diagram schematically illustrating an example of a configuration of a device management system according to a first embodiment.

FIG. 1 is a diagram schematically illustrating an example of a configuration of a device management system according to a first embodiment. The device management system includes a device management server 1000, a plurality of devices 2000, and a software management system 4000. The device management server 1000, the plurality of devices 2000, and the software management system 4000 are connected to each other via a communication line 3000 of a network.

Each device 2000 is an image processing device having at least one of a printing function and a scanning function and examples thereof include a multifunction peripheral (MFP), a printer, and a scanner.

For example, each device 2000 receives print data via the network and forms an image on a sheet using an existing printing method such as an electrophotography method or an inkjet method. Alternatively, each device 2000 reads an original using a scanner and copies image data of the original or transmits an e-mail thereof. Functions can be added to each device 2000 by installing an application.

Applications which are installed in the devices 2000 include two types of applications which will be described below. A first type of applications is applications which are delivered from the device management server 1000. A second type of applications is additional applications which are individually installed by a user for each device 2000 through an operation of an operation unit which is not illustrated in the device 2000. In general, the first type of applications is associated with basic functions of the devices 2000, and the second type of applications is used, for example, to add arbitrary functions to the devices 2000. Accordingly, the second type of applications often has a lower degree of importance than the first type of applications.

The device management server 1000 is an example of a management device and is a server device that takes charge of functions of managing the devices 2000 via the network.

The software management system 4000 is a system that manages applications which are installed in the devices 2000. The software management system 4000 includes an application management server 4001 that takes charge of a function of delivering an application and a license management server 4002 that takes charge of a function of managing a license of an application.

Here, it is assumed that each device 2000 communicates with the application management server 4001 or the license management server 4002 of the software management system 4000 via a LAN, an Internet line, or the like. For reasons such as defects of settings associated with a network environment or defects on the software management system 4000 side, there are cases in which the devices 2000 and the software management system 4000 are unable to communicate with each other.

Figure 2:
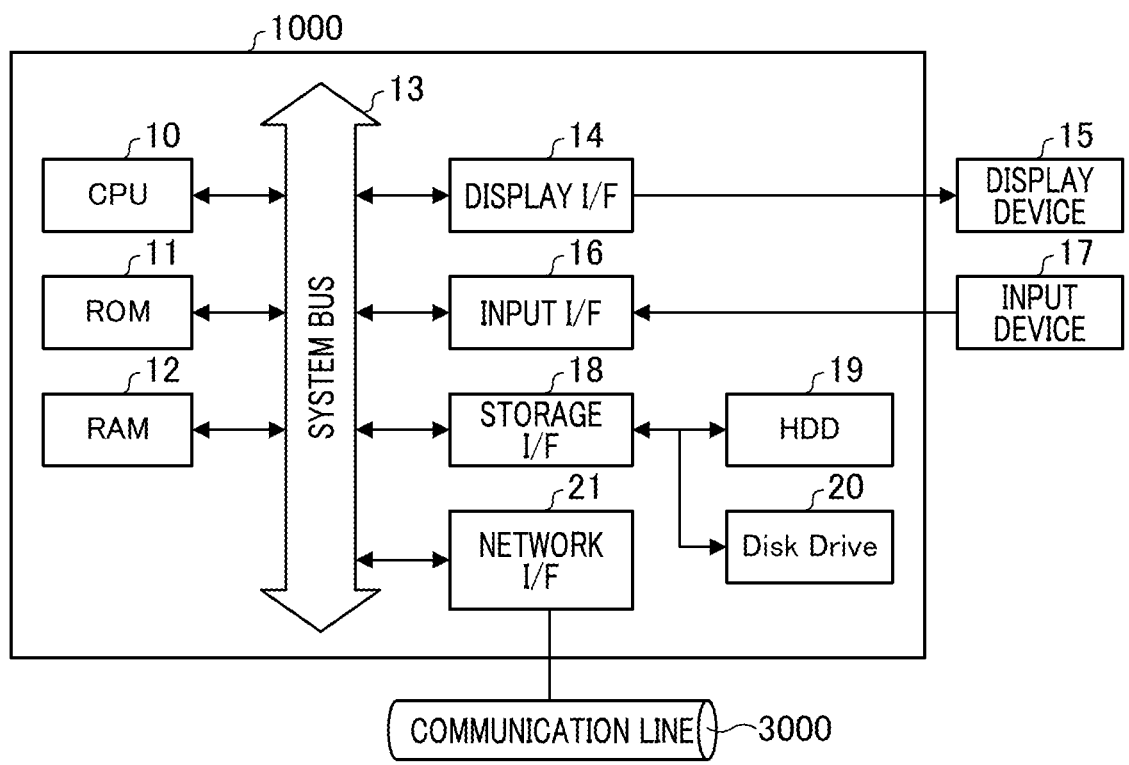
FIG. 2 is a diagram illustrating an example of a hardware configuration of a device management server.

FIG. 2 is a diagram illustrating an example of a hardware configuration of the device management server 1000.

The device management server 1000 includes a CPU 10, a ROM 11, a RAM 12, a system bus 13, a display I/F 14, an input I/F 16, a storage I/F 18, an HDD 19, a disk drive 20, and a network I/F 21.

The CPU 10, the ROM 11, the RAM 12, the display I/F 14, the input I/F 16, the storage I/F 18, and the network OF 21 are connected to each other via a system bus 13.

"CPU" is an abbreviation for "central processing unit," and "ROM" is an abbreviation for "read only memory." "RAM" is an abbreviation for "random access memory," and "HDD" is an abbreviation for "hard disk drive."

The CPU 10 performs various arithmetic operation processes in accordance with programs stored in the ROM 11, the HDD 19, or the like. The ROM 11 is a nonvolatile storage area and stores an operating system (OS) or other applications. The RAM 12 is a volatile storage area and is used as a temporary storage area when the CPU 10 performs various arithmetic operation processes.

The display I/F 14 is an interface that performs display output to a display device 15 such as a liquid crystal display monitor. The input I/F 16 is an interface that receives an input from an input device 17 such as a keyboard, a pointing device, or the like.

The storage I/F 18 is connected to the HDD 19 and the disk drive 20 and controls reading/writing of data therefrom/thereto. The HDD 19 is a nonvolatile mass storage medium. The disk drive 20 is a device that performs reading/writing of data from/to a detachable storage medium (not illustrated).

The network VF 21 is an interface that performs communication with devices over the communication line 3000.

Figure 3:
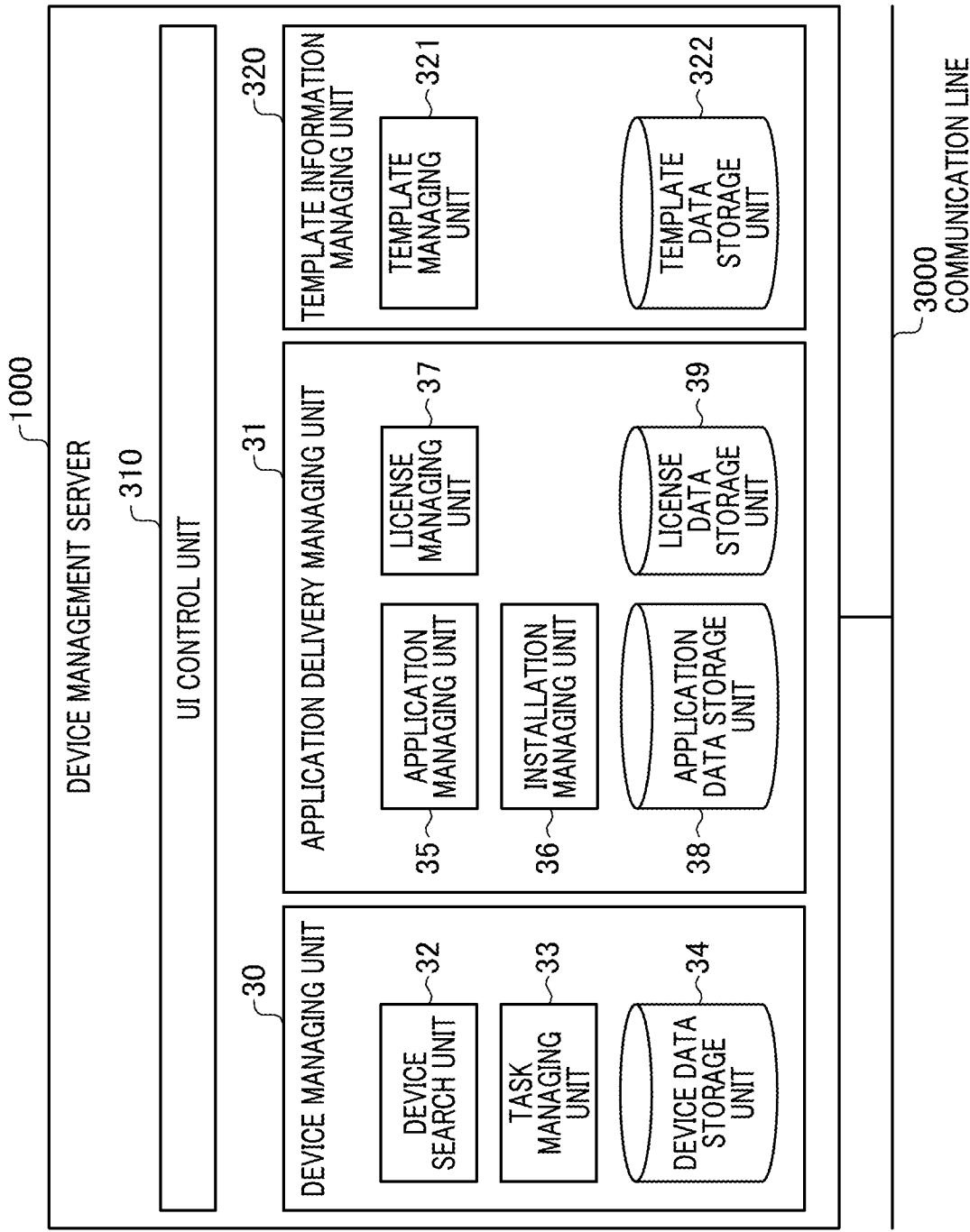
FIG. 3 is a diagram illustrating an example of a software configuration of the device management server.

FIG. 3 is a diagram illustrating an example of a software configuration of the device management server 1000.

The device management server 1000 includes a device managing unit 30, an application delivery managing unit 31, a UI control unit 310, and a template information managing unit 320 as software modules. These software modules function as entities of processes which will be described later and which are realized by executing device management software.

The UI control unit 310 takes charge of UI control of the device managing unit 30, the application delivery managing unit 31, and the template information managing unit 320. The UI control unit 310 may be realized as a web-based application. In this case, the function of the UI control unit 310 can be used by a device other than the device management server 1000 via a web browser.

The device managing unit 30 includes a device search unit 32, a task managing unit 33, and a device data storage unit 34. The device data storage unit 34 is a data storage unit such as a database that operates in the HDD 19 and stores table data such as a device list.

The device search unit 32 executes a task of searching for a device 2000 which is a management object at an arbitrary timing. The device search unit 32 acquires or changes device information such as a management information base (MIB) via the communication line 3000. The device search unit 32 acquires device information such as a device name, a product name, and an IP address from the device 2000 as a result of device search and stores the acquired device information in the device data storage unit 34.

An example of an algorithm of the device search unit 32 is a device search function of a device 2000 based on SNMP, IP Broadcast, SLP/Multicast, or the like. The algorithm of the device search unit 32 is not limited thereto.

The task managing unit 33 manages an execution timing of a task which is generated by the device search unit 32 or an installation managing unit 36 which will be described later and which is stored in the device data storage unit 34. The task managing unit 33 instructs the device search unit 32 or the installation managing unit 36 to execute a task in accordance with a schedule which is set in the task.

The task managing unit 33 also takes charge of a function of generating a task for monitoring an operation of an application in the device 2000.

The application delivery managing unit 31 includes an application managing unit 35, an installation managing unit 36, a license managing unit 37, an application data storage unit 38, and a license data storage unit 39. The application delivery managing unit 31 also takes charge of a function of delivering a first type of application to a device 2000.

The application managing unit 35 takes charge of a function of managing information acquired from the software management system 4000 and applications and storing management information or the like thereon in the application data storage unit 38. The application data storage unit 38 is a data storage unit that is constituted by a database operating in the HDD 19 or the like and stores application data which is management information acquired by the application managing unit 35.

The installation managing unit 36 receives an instruction on installation or uninstallation and performs creation or processing of a command for installing an application in a device 2000 or uninstalling an application from a device 2000.

The installation managing unit 36 takes charge of a function of acquiring information on applications installed in a device 2000 on the basis of a monitoring condition and ascertaining the applications. The installation managing unit 36 takes charge of a function of acquiring information on resources required for use of an application in a device 2000 from the device 2000. The installation managing unit 36 performs a process of displaying a warning or uninstalling an application based on a result of ascertainment.

The license managing unit 37 takes charge of a function of managing information acquired from the software management system 4000 and licenses and storing management information thereon or the like in the license data storage unit 39. The license data storage unit 39 is a data storage unit that is constituted by a database operating in the HDD 19 or the like and stores license data which is management information acquired by the license managing unit 37.

The template information managing unit 320 includes a template managing unit 321 that manages created template information and a template data storage unit 322 that stores the template information.

The template data storage unit 322 is a data storage unit that is constituted by a database operating in the HDD 19 or the like. The template data storage unit 322 stores an installation template, an uninstallation template, and an application monitoring template. These templates will be described later.

Figure 4:
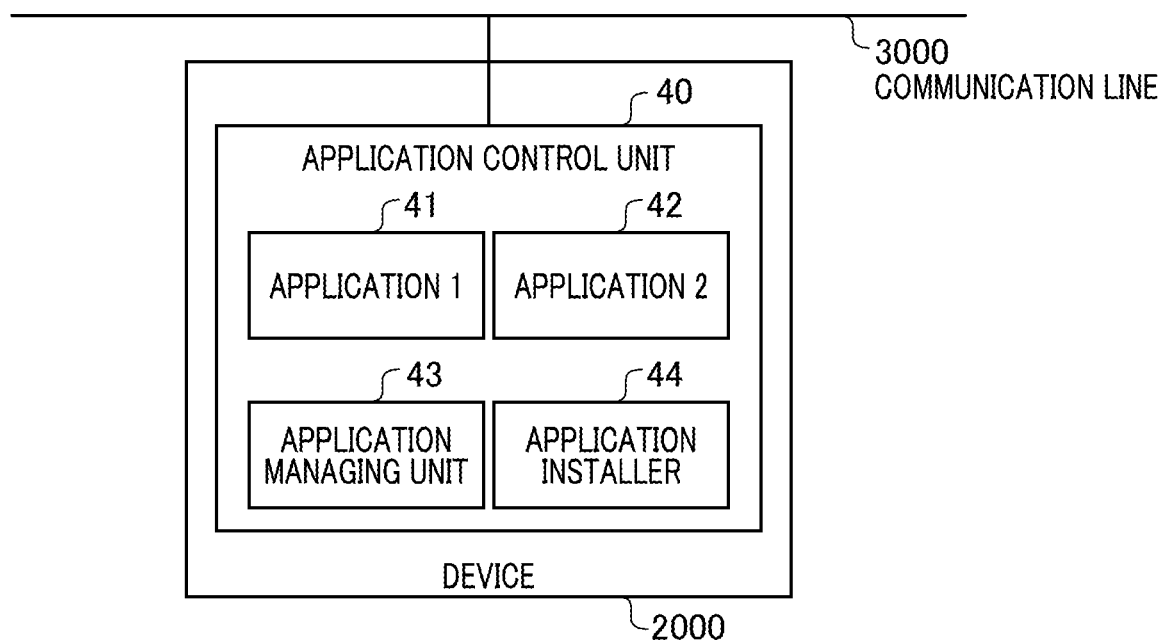
FIG. 4 is a diagram illustrating an example of a software configuration of a device.

FIG. 4 is a diagram illustrating an example of a software configuration of a device 2000.

An application control unit 40 that is a software module operating in the device 2000 includes a plurality of applications (41, 42), an application managing unit 43, and an application installer 44.

A plurality of applications can be installed in the device 2000. Such applications can be dynamically changed. In FIG. 4, applications 41 and 42 are illustrated as an example of the plurality of applications, but the number of applications is not limited the example illustrated in FIG. 4.

The applications 41 and 42 which are installed in the device 2000 are programs that provide various functions to a user in cooperation with the device 2000. Examples of the applications include a program for processing and compressing an image, a program for performing department management such as print restriction, and a plug-in module that is assembled as a part of an application. Examples of the applications include a program for performing remote management of a device, a program for controlling units such as a finisher (not illustrated) of the device 2000 such that bookbinding is performed, and a program for converting and analyzing specific document data. Examples of the applications include a document creation program such as word-processor software, a schedule management program, a spreadsheet program, a database management program, and a server program for realizing a print service via the Internet.

The application managing unit 43 takes charge of a function of managing a plurality of applications which can be dynamically changed. Both of the applications 41 and 42 serve as application modules that operate and provide services of the device under the control of the application managing unit 43.

When an application is incorporated into the device 2000 by installation, the application managing unit 43 adds the installed application as a management object. When an application is deleted from the device 2000 by uninstallation, the application managing unit 43 deletes the uninstalled application from the management objects.

The application installer 44 takes charge of a function of installing an application in the device 2000 or uninstalling an application from the device 2000.

FIG. 5 illustrates an example of an operation on an installation template or an uninstallation template as a sequence example of a basic process routine which is performed by the device management system. The left part of FIG. 5 illustrates a sequence example at the time of creation of a template and creation of a task, and the right part of FIG. 5 illustrates a sequence example at the time of execution of a task.

The creation of a template and the creation of a task illustrated in the left part of FIG. 5 will be described first below.

In the software management system 4000, registration of applications is performed in advance. At this time, the applications and information such as names, versions, and identifiers (hereinafter referred to as IDs) thereof are registered in the software management system 4000. In the software management system 4000, it is assumed that the applications are correlated with product keys for authenticating the applications.

When an application is installed/uninstalled by the device management server 1000, the device management server 1000 performs creation of an installation template or an uninstallation template (500). A template corresponds to an instruction sheet in which instructions which are executed in execution of a task which will be described later are defined.

The device management server 1000 acquires a list of applications at the time of creation of a template (500) (501). At this time, a product key is transmitted from the device management server 1000 to the software management system 4000 (502).

When the product key is received, the software management system 4000 returns information such as the name, the version, and the ID of the application to the device management server 1000 (503). Accordingly, the device management server 1000 can display the information such as the name, the version, and the ID of the application on a UI. When there are a plurality of applications correlated with the product key, information of the plurality of applications is displayed on the UI.

The device management server 1000 receives a selection input of an application to be installed/uninstalled and a version thereof from a user via the UI (504). The device management server 1000 receives a selection input of an operation (such as installation or uninstallation) for the selected application from the user via the UI (505). Thereafter, the device management server 1000 stores an installation template or an uninstallation template which is created on the basis of the input from the user (506).

FIG. 6A is a diagram illustrating a UI display example at the time of creation of a template. In the UI display example illustrated in FIG. 6A, items of versions 1.0 and 1.1 of application B are displayed to be selectable along with an ID in correlation with a template of installation A corresponding to a predetermined product key.

When a certain process is performed by the device management server 1000, the device management server 1000 performs creation of a task (507).

First, the device management server 1000 receives selection of a template from the user via the UI (508). In this selection of a template, an installation/uninstallation template of a desired application is selected out of one or more templates which are created in advance.

FIG. 6B is a diagram illustrating a UI display example at the time of selection of a template. In the UI display example illustrated in FIG. 6B, a status in which one template is selected from installation templates A, B, and C is displayed.

Then, the device management server 1000 receives selection of a device from the user via the UI (509). In this selection of a device, a device in which the desired application is installed/uninstalled is selected, and a plurality of devices can also be selected.

FIG. 7A is a diagram illustrating a UI display example at the time of selection of a device. In the UI display example illustrated in FIG. 7A, a status in which one device is selected from devices with device names "iR 2200," "iR 2300," and "iR 2800" is displayed. In FIG. 7A, items "device name," "host name," "IP address," and "serial number" are displayed in correlation with each device which can be selected.

Then, the device management server 1000 receives selection of a schedule from the user via the UI (510). In this selection of a schedule, a schedule in which a task is executed is selected.

FIG. 7B is a diagram illustrating a UI display example at the time of selection of a schedule. In the UI display example illustrated in FIG. 7B, one of items "execute immediately," "execute at a designated date and time," and "execute periodically" can be selected as the schedule. When "execute at a designated date and time" or "execute periodically" is selected, conditions such as a date and time can also be input, although this is not illustrated.

Thereafter, the device management server 1000 stores the task which is created on the basis of the input from the user (511).

Execution of a task illustrated in the right part of FIG. 5 will be described below.

When a scheduled date and time comes, the device management server 1000 executes the stored task (521).

First, the device management server 1000 transmits an ID to the device 2000 (522). When the ID is received, the device 2000 ascertains whether an application corresponding to the ID has been installed (523). Then, the device 2000 returns information of a status indicating a result of ascertainment of installation to the device management server 1000 (524).

In the case of an installation task, the device management server 1000 transmits the ID to the software management system 4000 (525). When the ID is received, the software management system 4000 transmits an application corresponding to the ID to the device management server 1000 (526). The processes of 525 and 526 are both skipped in the case of an uninstallation task.

The device management server 1000 transmits an instruction on installation or uninstallation to the device 2000 on the basis of details of the task (527). In the case of an installation task, the device management server 1000 transmits the application received from the device management server 1000 along with the instruction to the device 2000.

When the instruction on installation or uninstallation is received, the device 2000 performs installation or uninstallation of the application corresponding to the ID (528).

Then, when the installation or uninstallation ends, the device 2000 transmits an end notification to the device management server 1000 (529).

This concludes the description with reference to FIG. 5.

An example of an operation on an application monitoring template in the device management system according to the first embodiment will be described below in detail with reference to FIG. 8. The left part of FIG. 8 illustrates a sequence example at the time of creation of a template and creation of a task, and the right part of FIG. 8 illustrates a sequence example at the time of execution of a task.

Figure 8:
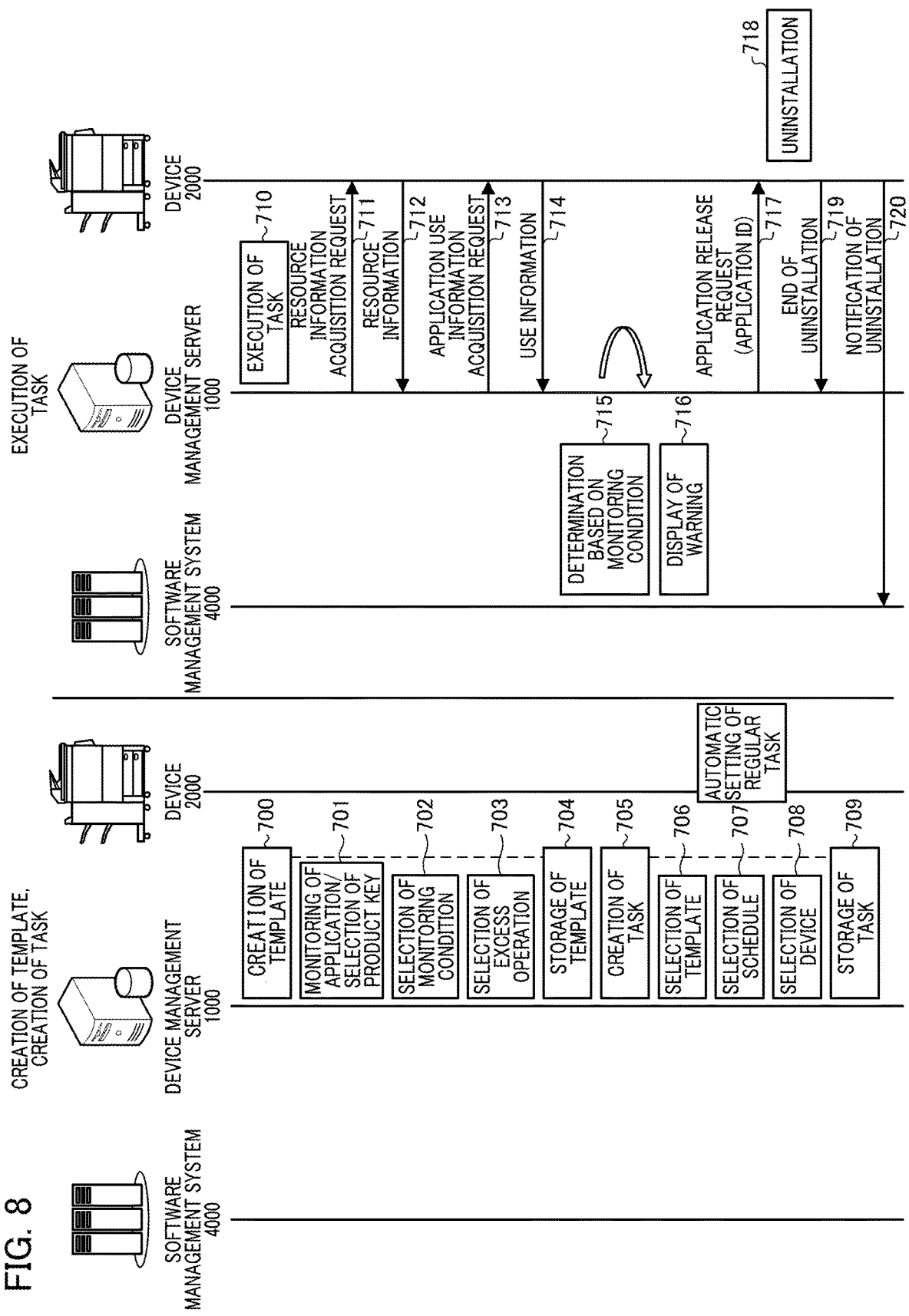
FIG. 8 is a diagram illustrating a sequence example in the device management system according to the first embodiment.

FIG. 8 is a diagram illustrating a sequence example of the device management system according to the first embodiment. FIG. 8 corresponds to the sequence illustrated in FIG. 5, where it is assumed that applications have been registered in advance in the software management system 4000 similarly to FIG. 5.

Creation of a template and creation of a task illustrated in the left part of FIG. 8 will be described first below.

In FIG. 8, the device management server 1000 performs creation of an application monitoring template (700) when the applications are monitored.

Figure 9A:
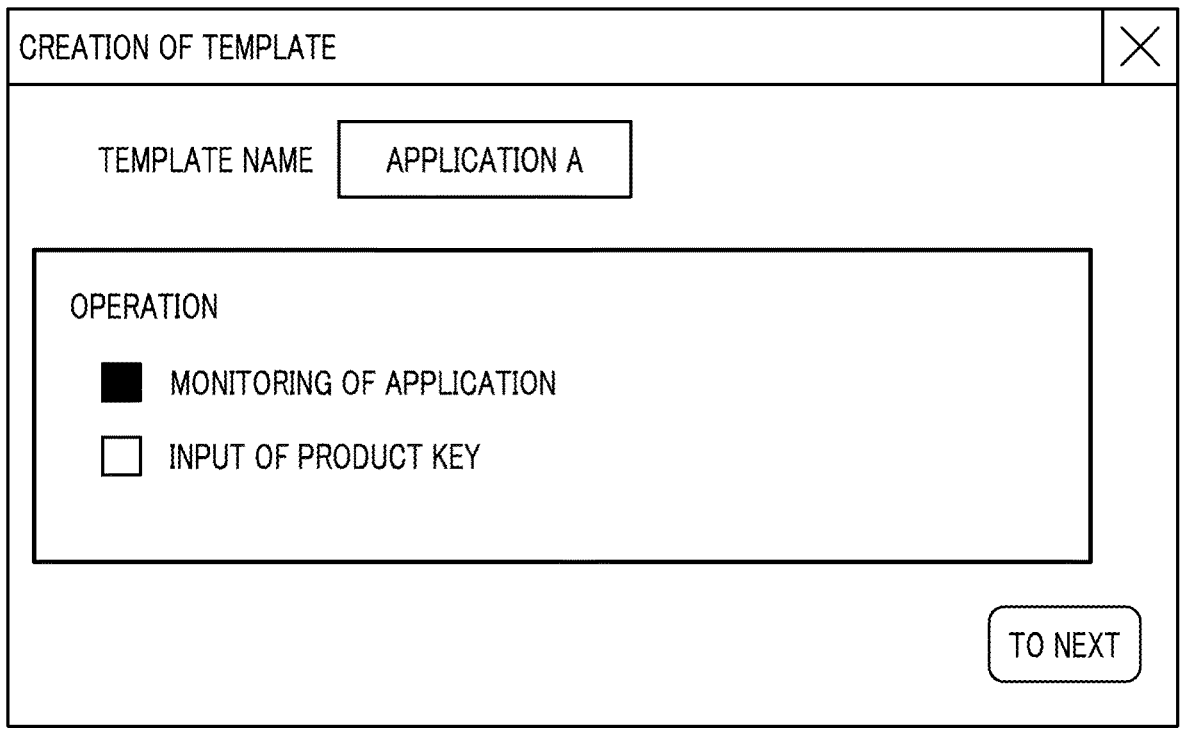
FIGS. 9A and 9B are diagrams illustrating display examples of the template creation screen.

At the time of creation of an application monitoring template, for example, a template creation screen illustrated in FIG. 9A is displayed by the device management server 1000. Then, the device management server 1000 receives an input for selecting "monitoring of application" or "input of product key" from a user (701). Here, it is assumed that "monitoring of application" is selected in the process of 701 of FIG. 8.

Figure 9B:
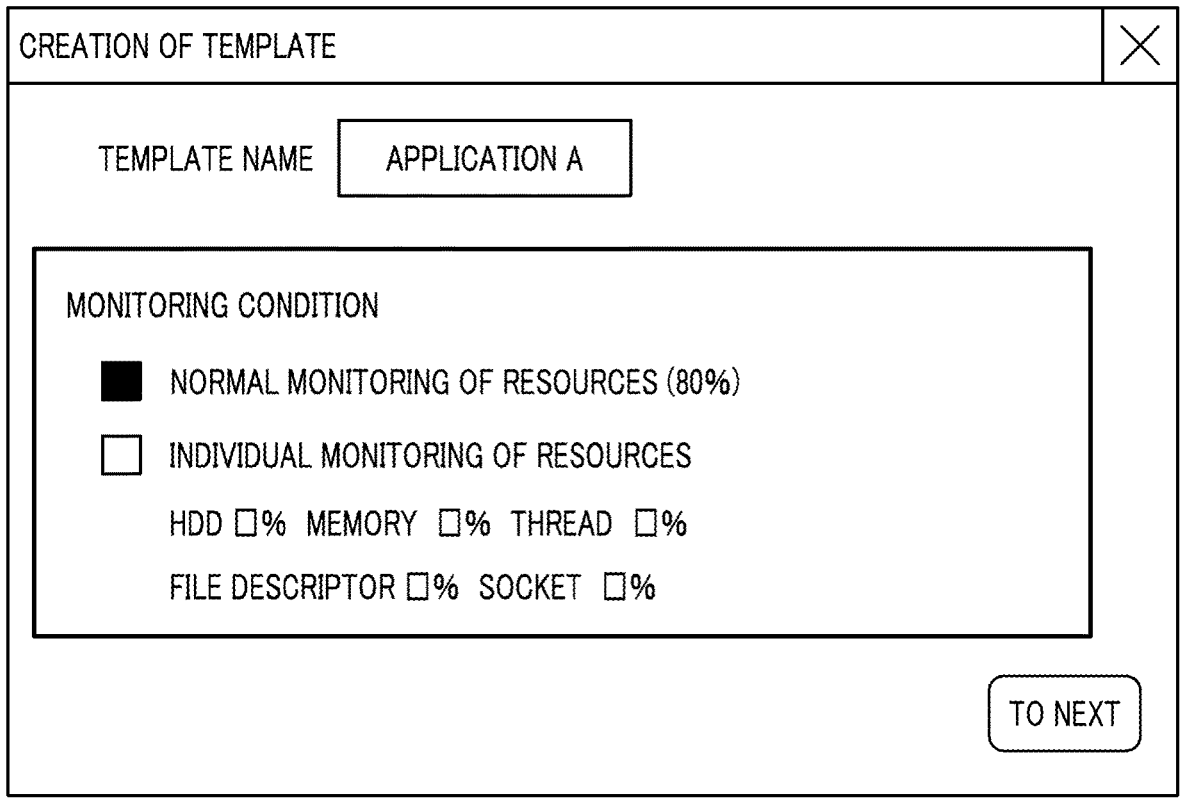

Then, for example, a template creation screen illustrated in FIG. 9B is displayed by the device management server 1000. The device management server 1000 receives an input for selecting a monitoring condition from a user (702). The monitoring condition is a threshold value for determination when an operation is performed in the application monitoring template, and prescribes a resource status of the device 2000.

Options of the monitoring condition include, for example, "normal monitoring of resources" and "individual monitoring of resources." The normal monitoring of resources is based on a condition in which one of HDD, memory, thread, file descriptor, and socket volume exceeds a specific proportion of the resources. In the example illustrated in FIG. 9B, the specific proportion is set to 80%, and proportions of resources in the normal monitoring of resources can be appropriately changed. The individual monitoring of resources is based on a condition in which HDD, memory, thread, file descriptor, and socket volume are individually designated and exceed specific proportions of the resources.

Here, it is assumed that "normal monitoring of resources" is selected in the process of 702 of FIG. 8.

Figure 10A:
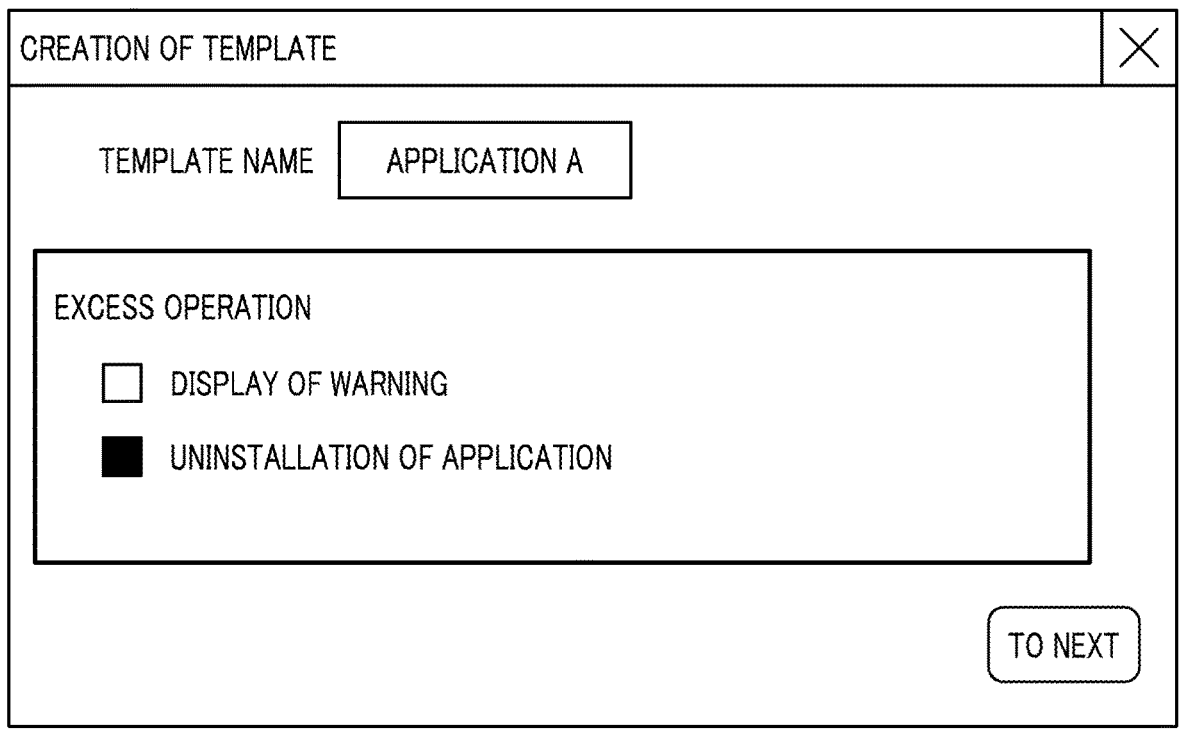
FIGS. 10A and 10B are diagrams illustrating display examples of the template creation screen.

Then, for example, a template creation screen illustrated in FIG. 10A is displayed by the device management server 1000. The device management server 1000 receives an input for selecting an operation which is performed when the monitoring condition is satisfied (at the time of resource excess) from a user (703).

Options of the operation which is performed at the time of resource excess include, for example, "display of warning" and "uninstallation of application." Here, it is assumed that "uninstallation of application" is selected in the process of 703 of FIG. 8.

When uninstallation of an application is selected, the device management server 1000 receives an input for selecting an application which is an uninstallation object from a user via the template creation screen.

Figure 10B:
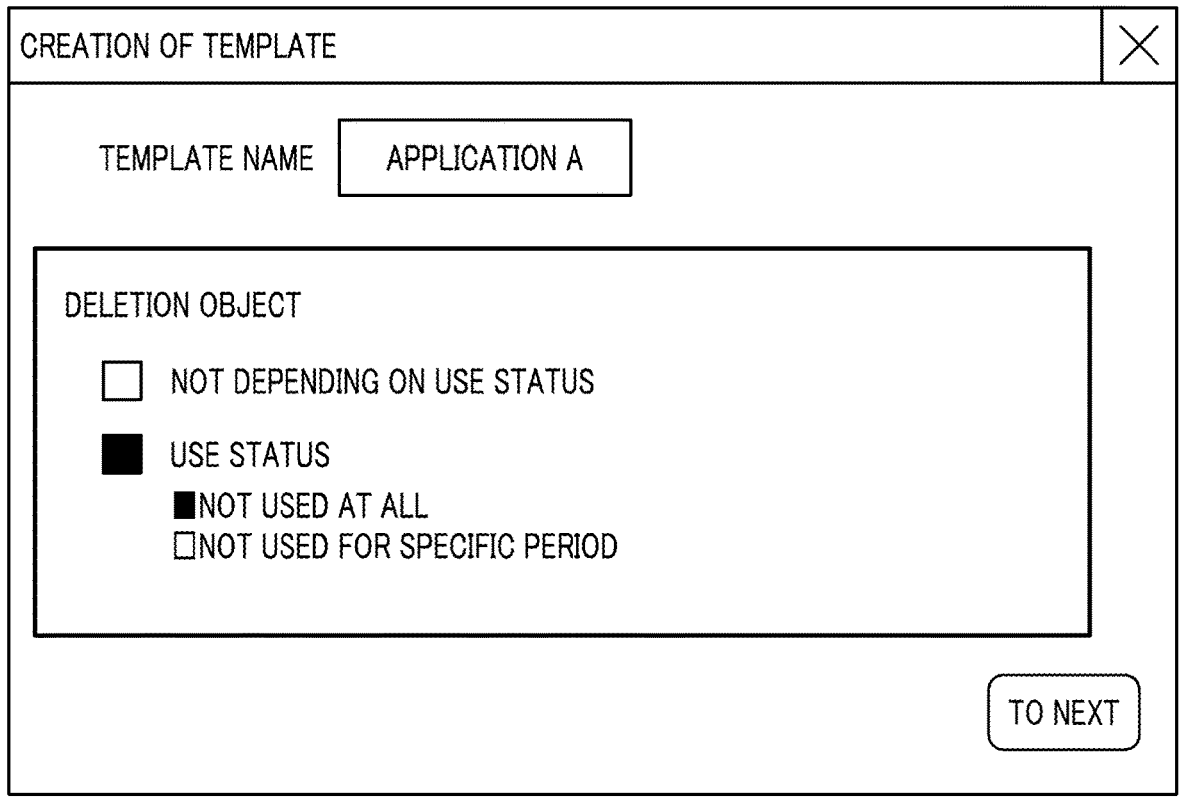

At this time, for example, a template creation screen illustrated in FIG. 10B is displayed by the device management server 1000. Then, the device management server 1000 receives an input for selecting a use status of an application to be uninstalled from a user. Options of the use status include, for example, "not depending on use status," "not used at all," and "not used for specific period." Here, it is assumed that "not used at all" is selected.

When uninstallation of an application is selected, the device management server 1000 receives an input for selecting deletion of an application at the time of execution of a task from the user via the template creation screen. At this time, for example, a template creation screen illustrated in FIG. 11 is displayed by the device management server 1000. Options of the selecting deletion include, for example, "manual (an application to be deleted is manually selected at the time of execution of a task)" and "automatic (an application to be deleted is automatically selected at the time of execution of a task)."

For example, when "manual" is selected in FIG. 11, applications which are objects are arranged at the time of execution of a task and an application to be deleted can be selected by a user. For example, when "automatic" is selected in FIG. 11, an application to be deleted is selected by the device management server 1000. Here, it is assumed that "manual" is selected.

In the case of "automatic," an application is selected, for example, based on criteria such as an amount of used resources and an internal priority level, and the selection criteria can also be changed by a setting file or the like regardless of a method thereof.

Thereafter, the device management server 1000 stores an application monitoring template which is created on the basis of the input from the user (704).

When a certain process is to be performed by the device management server 1000, the device management server 1000 performs creation of a task (705).

First, the device management server 1000 receives selection of a template from a user via the U1 (706). In this selection of a template, it is assumed that the application monitoring template is selected.

Figure 14:
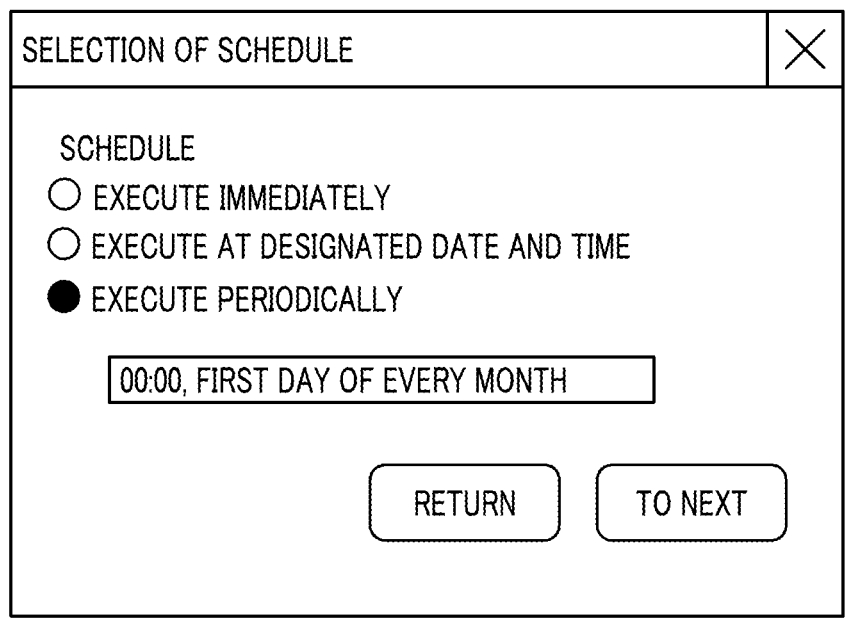
FIG. 14 is a diagram illustrating a display example of the schedule selection screen.

When the application monitoring template is selected, the device management server 1000 automatically sets a schedule for executing a task to a regular task (707). FIG. 14 illustrates an example of a schedule selection screen when a regular task is set by selection of the application monitoring template. In the example illustrated in FIG. 14, a schedule in which a task is executed at 00:00 on the first day of every month is set. An execution interval of a task is set to a month in FIG. 14, but the execution interval of a task may be appropriately changed by a setting file or the like or the execution interval of a task which was previously set may be maintained. Since the schedule is automatically set, the device management server 1000 may omit display of schedule setting.

The device management server 1000 receives an input for selecting a device executing a task from a user via the device selection screen (FIG. 7A) (708). Thereafter, the device management server 1000 stores the created task (709).

Execution of a task illustrated in the right part of FIG. 8 will be described below.

When a scheduled date and time comes, the device management server 1000 executes the stored task (710).

First, the device management server 1000 transmits a request for acquisition of resource information including a request for acquisition of application information to the device 2000 (711). The resource information is used to ascertain resources of the device 2000 required for use of an application.

When the request for acquisition is received, the device 2000 returns information on a name, a version, and an ID of an application as information of each application installed in the device 2000 to the device management server 1000. The device 2000 returns, for example, information on HDD, memory, thread, file descriptor, and socket volume as the resource information to the device management server 1000 (712). Accordingly, the device management server 1000 acquires application information and resource information of the device 2000.

Here, it is assumed that, for example, information indicating applications A, B, C, and D is acquired as information on applications to be installed in correlation with the version and the ID of each application. It is assumed that, for example, information indicating that 90% of resources of the HDD of the device 2000 are used is acquired as the resource information.

The device management server 1000 transmits a request for acquisition of use information of an application according to necessity (713).

When the request for acquisition is received, the device 2000 returns use information indicating use statuses of applications to the device management server 1000 (714).

The device management server 1000 determines whether the monitoring condition of the application monitoring template is satisfied (715). When the monitoring condition is satisfied, the device management server 1000 performs a warning display process (716) or performs an application uninstallation process (717 to 720) on the basis of the setting of the application monitoring template. Here, the application uninstalling process is performed by the selection in 703.

The application which is uninstalled in the uninstallation process (717 to 720) is, for example, a second type of application.

When "manual" is selected in the selection of deletion of an application (FIG. 11) as described above, the device management server 1000 receives an input for selecting an application to be uninstalled via the UI from a user. At this time, for example, an uninstallation application selection screen illustrated in FIG. 20A is displayed by the device management server 1000.

Figure 20A:
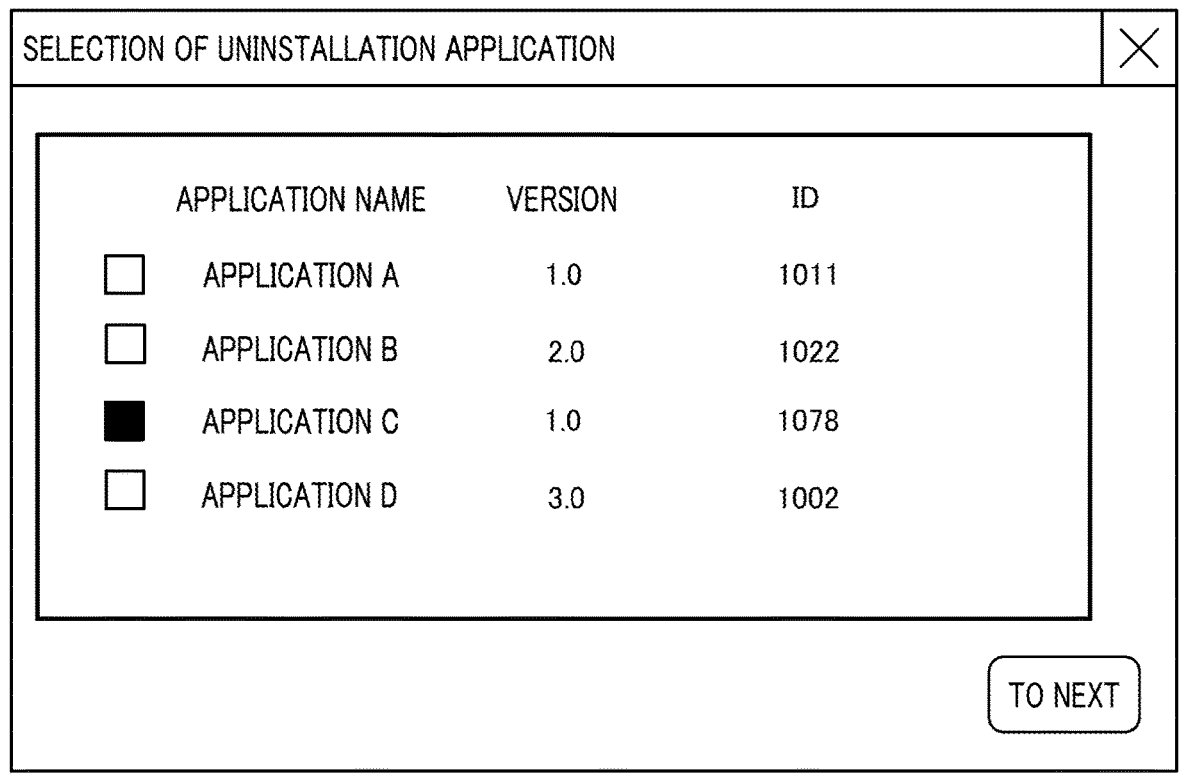
FIG. 20A is a diagram illustrating a display example of an uninstallation application selection screen and FIG. 20B is a diagram illustrating a display example of a warning.

In the screen illustrated in FIG. 20A, names (A to D) of applications which can be uninstalled from the device 2000 are displayed in a list in correlation with versions and IDs thereof. The device management server 1000 determines an application selected on the screen illustrated in FIG. 20A by a user as an uninstallation object. Here, it is assumed that application C is selected as an uninstallation object.

The device management server 1000 transmits a request for deletion of an application to the device 2000 (717). Specifically, the device management server 1000 transmits an instruction on uninstallation of the application along with the ID "1078" of application C.

When the request for deletion is received, the device 2000 uninstalls application C corresponding to the ID "1078" of the request for deletion (718). When the uninstallation has been completed, the device 2000 notifies the device management server 1000 of end of uninstallation (719). The device 2000 transmits an uninstallation notification of application C to the software management system 4000 (720).

This concludes the description with reference to FIG. 8.

Figure 15:
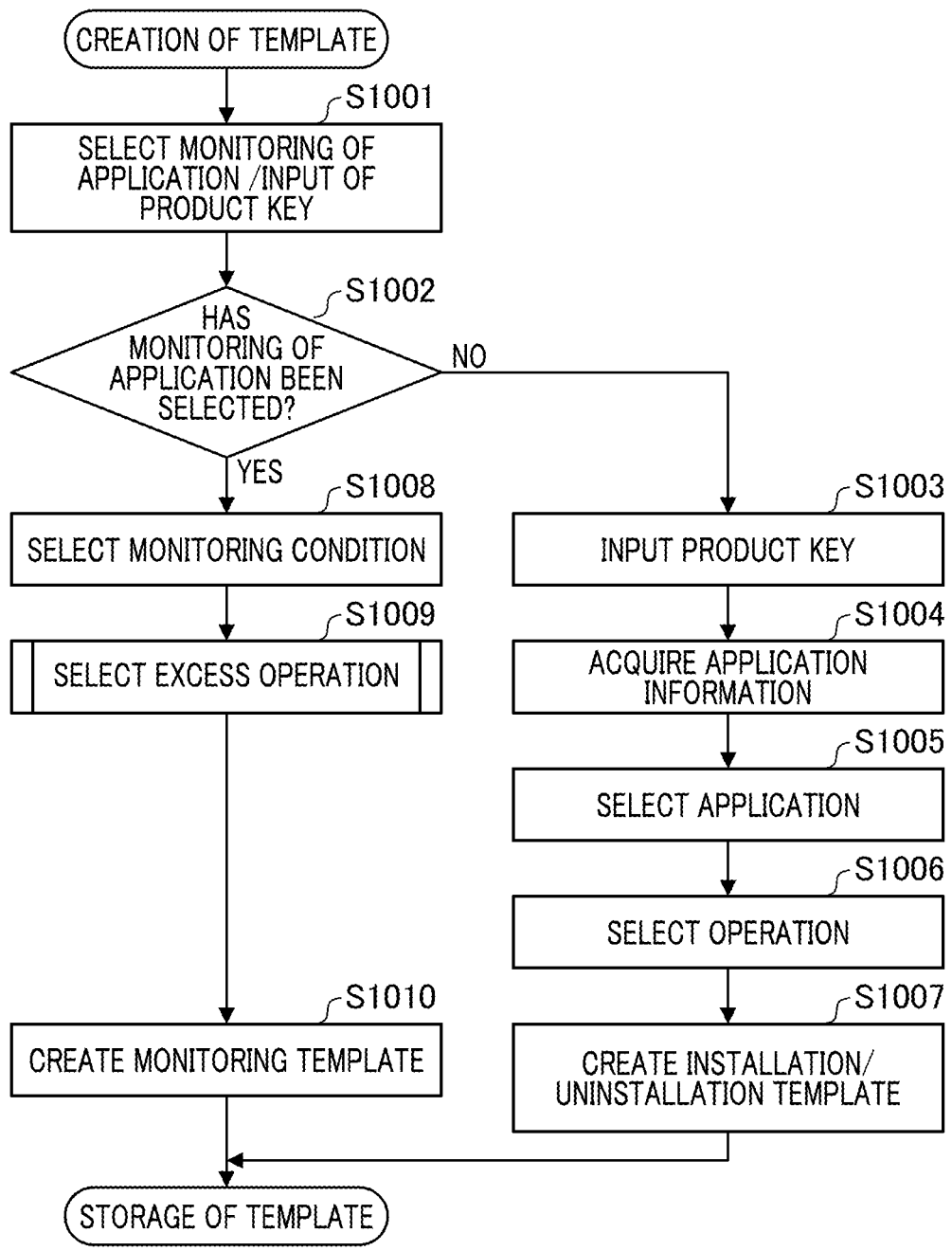
FIG. 15 is a flowchart illustrating an operation example at the time of creation of a template in the device management server according to the first embodiment.

FIG. 15 is a flowchart illustrating an example of an operation at the time of creation of a template in the device management server 1000 according to the first embodiment.

The routine illustrated in FIG. 15 is embodied by causing the CPU 10 of the device management server 1000 to load a program into the RAM 12 and to execute the loaded program.

In S1001, the template managing unit 321 receives an instruction on an application monitoring operation or an input of a product key to an arbitrary application from a user. This input is performed on the template creation screen via the U1 control unit 310.

In S1002, the template managing unit 321 determines whether the instruction on an application monitoring operation has been selected in S1001. The selection of S1002 corresponds to, for example, an input on the screen illustrated in FIG. 9A. When the instruction on an application monitoring operation has been selected, the routine proceeds to S1008. An operation which is performed when the instruction on an application monitoring operation has been selected corresponds to the operations of 702 to 704 in FIG. 8.

On the other hand, when the input of a product key has been selected, the routine proceeds to S1003. An operation which is performed when the input of a product key has been selected corresponds to the operations of 501 to 506 in FIG. 5.

In S1003, the template managing unit 321 receives the input of a product key from a user via the template creation screen. Accordingly, the product key for an application to be operated is determined.

In S1004, the template managing unit 321 transmits the input product key to the software management system 4000. Accordingly, the template managing unit 321 can acquire application information including an ID by causing the software management system 4000 to respond thereto.

In S1005, the template managing unit 321 displays selectable application information correlated with the product key on the basis of the information acquired in S1004. The template managing unit 321 receives an input for selecting an application which is an operation object from a user via the template creation screen. Accordingly, an application which is an operation object is determined.

In S1006, the template managing unit 321 receives an input for selecting an operation (installation or uninstallation) of the application which is an operation object from a user via the template creation screen.

In S1007, the template managing unit 321 creates an installation template or an uninstallation template on the basis of the input from the user. The template managing unit 321 stores the created template information in the template data storage unit 322, and the routine illustrated in FIG. 15 ends.

In S1008, the template managing unit 321 receives an input for selecting a monitoring condition ("normal monitoring of resources" or "individual monitoring of resources") from a user via the template creation screen illustrated in FIG. 9B.

In S1009, the template managing unit 321 receives an input for selecting an operation when the monitoring condition is satisfied, that is, at the time of resource excess, from a user via the template creation screen. The process of S1009 will be described later with reference to FIGS. 18A and 18B.

In S1010, the template managing unit 321 creates an application monitoring template for monitoring resources of the device 2000 on the basis of the selections in S1008 and S1009. Then, the template managing unit 321 stores the created template information in the template data storage unit 322, and the routine illustrated in FIG. 15 ends.

Figure 18A:
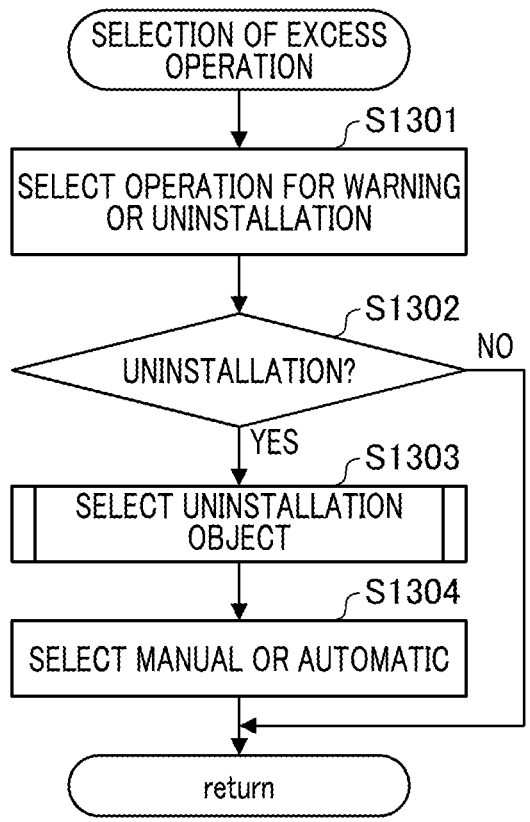
FIGS. 18A to 18D are flowcharts illustrating examples of a subroutine of S1009 in FIG. 15.
Figure 18B:
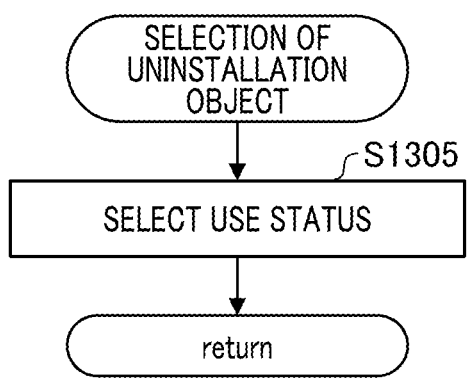

FIGS. 18A and 18B are flowcharts illustrating an example of an excess operation selecting routine in S1009 of FIG. 15.

In S301, the template managing unit 321 receives an input for selecting "display of warning" or "uninstallation of application" from a user, for example, via a template creation screen illustrated in FIG. 10A as the operation when the resources of the monitoring condition have been exceeded. Accordingly, the type of the operation at the time of resource excess is determined.

In S1302, the template managing unit 321 determines whether an instruction on "uninstallation of application" has been selected in S1301. When "uninstallation of application" has been selected, the routine proceeds to S1303. On the other hand, when "display of warning" has been selected, the routine proceeds to S1010 of FIG. 15.

In S1303, the template managing unit 321 receives an input for selecting an application to be uninstalled from a user via the template creation screen. At this time, the process of S1305 of FIG. 18B which is a subroutine of S1303 is performed.

In S1305, the template managing unit 321 receives an input for selecting use status of an application to be uninstalled from a user, for example, via the template creation screen illustrated in FIG. 10B. Options of the use status include, for example, "not depending on use status," "not used at all," and "not used for specific period." When the process of S1305 ends, the routine proceeds to S1304 of FIG. 18A.

In S1304, the template managing unit 321 receives an input for selecting deletion of an application at the time of execution of a task from a user, for example, via the template creation screen illustrated in FIG. 11. Options of the deletion include, for example, "manual" and "automatic." When the process of S1304 ends, the routine proceeds to S1010 of FIG. 15.

This concludes the description of the operation at the time of creation of a template according to the first embodiment. The processes of 700 to 704 in FIG. 8 are realized by the operation.

FIG. 17 is a flowchart illustrating an example of an operation at the time of creation of a task in the device management server 1000 according to the first embodiment. The routine illustrated in FIG. 17 is embodied by causing the CPU 10 of the device management server 1000 to load a program to the RAM 12 and to execute the loaded program.

In S1201, the task managing unit 33 receives an input for selecting a template which is executed in the task from a user via the template selection screen (FIG. 68). Accordingly, a template which is executed in the task is determined.

In S1202, the task managing unit 33 determines whether the template selected in S1201 is an application monitoring template. When an application monitoring template has been selected, the routine proceeds to S1203. On the other hand, when an application monitoring template has not been selected, the routine proceeds to S1204.

In S1203, the task managing unit 33 sets a schedule for executing a task to a schedule in which the task is regularly executed (regular task). Thereafter, the routine proceeds to S1205.

In S1204, the task managing unit 33 receives an input for selecting a schedule for executing a task from a user via the schedule selection screen (FIG. 7B). Thereafter, the routine proceeds to S1205.

In S1205, the task managing unit 33 receives an input for selecting a device executing a task from a user via the device selection screen (FIG. 7A).

A task is created through this routine. Thereafter, the task managing unit 33 stores the created task in the device data storage unit 34.

This concludes the description of the operation at the time of creation of a task according to the first embodiment. The processes of 705 to 709 in FIG. 8 are realized by the operation.

Figure 16:
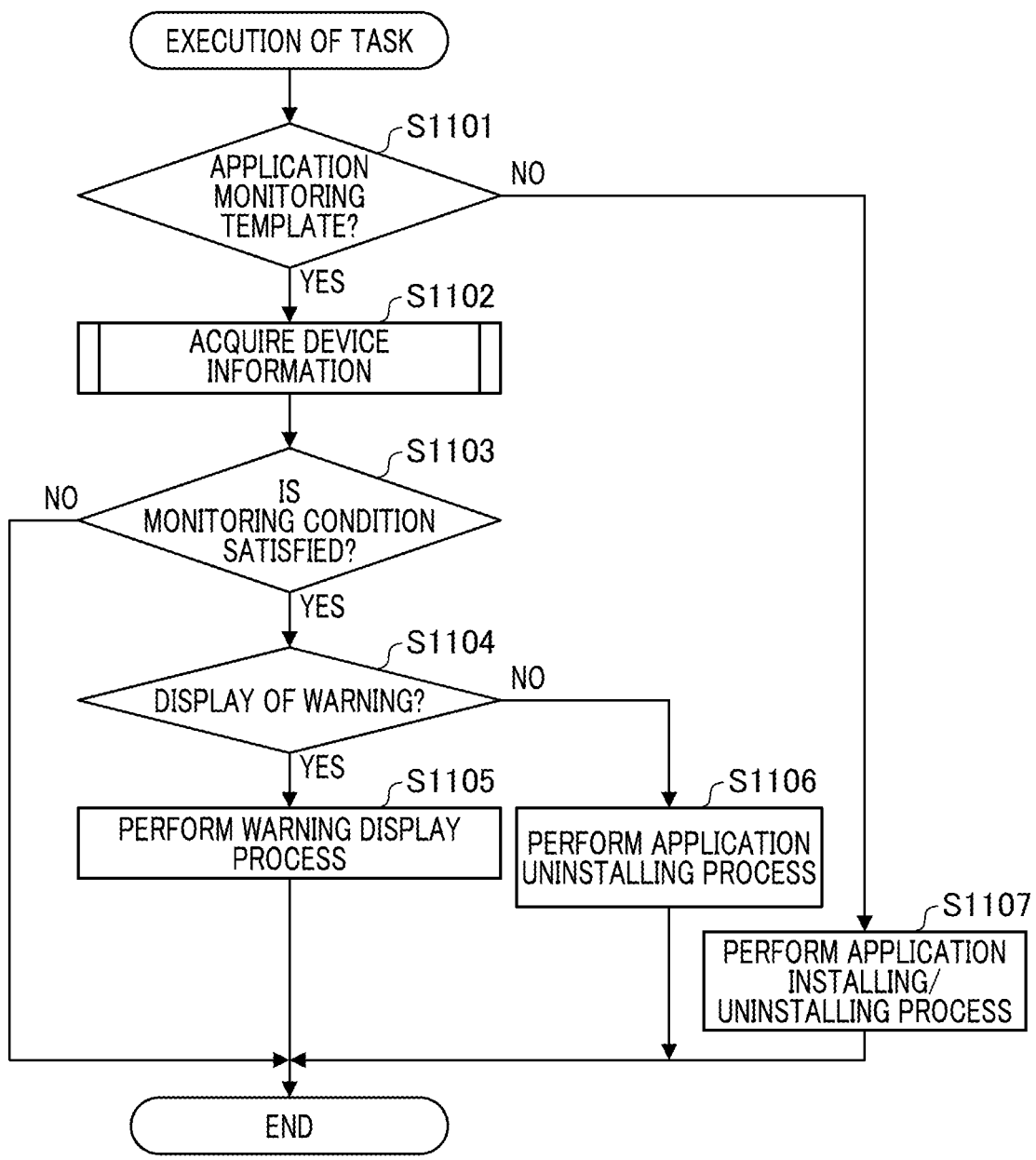
FIG. 16 is a flowchart illustrating an operation example at the time of execution of a task in the device management server according to the first embodiment.

FIG. 16 is a flowchart illustrating an example of an operation at the time of execution of a task in the device management server 1000 according to the first embodiment. The routine illustrated in FIG. 16 is started when an execute date and time of the task in the schedule has come.

The routine illustrated in FIG. 16 is embodied, for example, by causing the CPU 10 of the device management server 1000 to load a program to the RAM 12 and to execute the loaded program.

In S1101, the installation managing unit 36 determines whether the template selected in the task to be executed is an application monitoring template. When an application monitoring template has been selected, the routine proceeds to S1102. On the other hand, when an application monitoring template has not been selected, the routine proceeds to S107.

In S1102, the installation managing unit 36 acquires application information from the device 2000 selected in the task to be executed. The process of S1102 will be described later with reference to FIG. 19A.

In S1103, the installation managing unit 36 determines whether the application information acquired in S1102 satisfies a monitoring condition of the task to be executed. When the application information satisfies the monitoring condition, the routine proceeds to S1104. On the other hand, when the application information does not satisfy the monitoring condition, the routine illustrated in FIG. 16 ends.

In S1104, the installation managing unit 36 determines whether the operation at the time of resource excess selected in the task to be executed is display of a warning. When the display of a warning is selected, the routine proceeds to S1105. On the other hand, when the uninstallation of an application is selected, the routine proceeds to S1106.

Figure 20B:
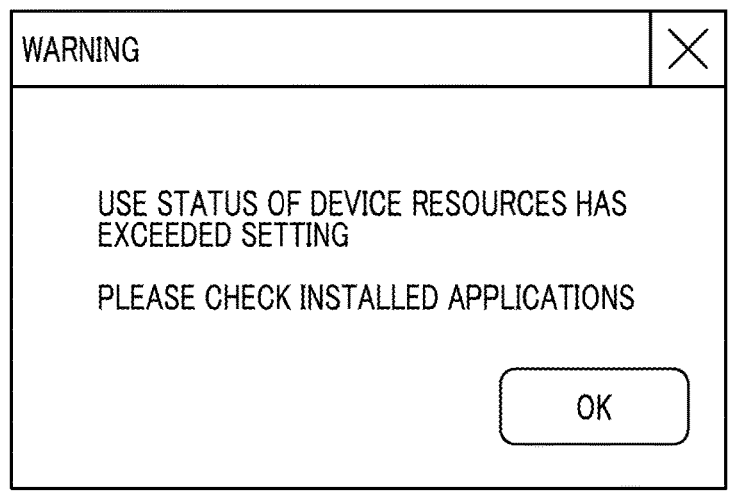

In S1105, the installation managing unit 36 performs, for example, display of a warning illustrated in FIG. 20B via the UI control unit 310. The display of a warning includes a message for notifying that the use status of resources of a device exceeds the settings and a message for urging ascertainment of applications installed in the device. Thereafter, the routine illustrated in FIG. 16 ends.

In S1106, the installation managing unit 36 performs an application uninstalling process.

When deletion of an application is set to "automatic" in the application monitoring template, the installation managing unit 36 determines an application to be uninstalled on the basis of settings of the application monitoring template (S1303 and S1305). When deletion of an application is set to "manual" in the application monitoring template, the installation managing unit 36 determines an application to be uninstalled on the basis of an input for selection from a user via the UI control unit 310. Thereafter, the installation managing unit 36 transmits a request for deletion of an application to the device 2000, and the routine illustrated in FIG. 16 ends.

In S1107, the installation managing unit 36 performs an application installing process or an application uninstalling process on the basis of an installation template or an uninstallation template. Thereafter, the routine illustrated in FIG. 16 ends.

Figure 19A:
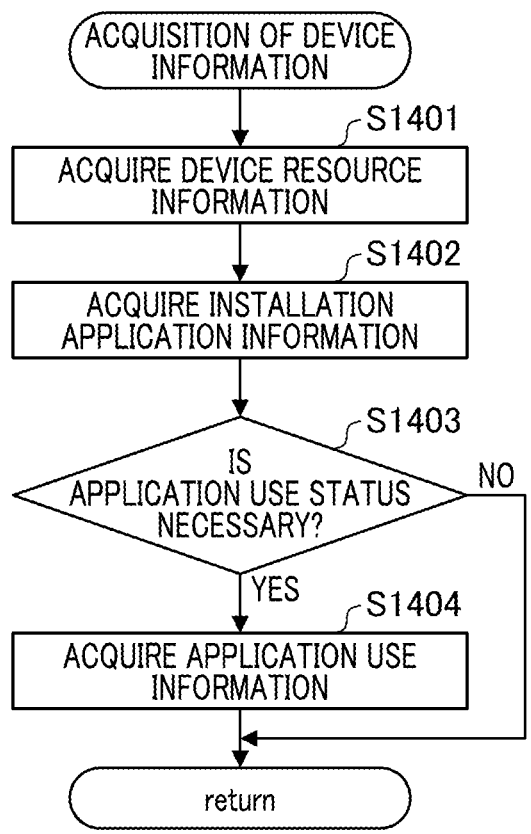
FIGS. 19A and 19B are flowcharts illustrating examples of a subroutine of S1102 in FIG. 16.

FIG. 19A is a flowchart illustrating an example of a device information acquiring process of S1102 in FIG. 16.

In S1401, the installation managing unit 36 acquires resource information of the device 2000 from the device 2000 selected in the task to be executed.

In S1402, the installation managing unit 36 acquires information of applications installed in the device 2000 selected in the task to be executed from the device 2000.

Specifically, in S1401 and S1402, the installation managing unit 36 transmits a request for acquisition of resource information including a request for acquisition of application information to the device 2000 (711 in FIG. 8). When the request for acquisition is received, the device 2000 returns information on names, versions, and IDs of applications as information on applications installed in the device 2000 to the device management server 1000. The device 2000 returns, for example, information on HDD, memory, thread, file descriptor, and socket volume as the resource information to the device management server 1000 (712 in FIG. 8). Accordingly, the installation managing unit 36 can acquire the application information and the resource information of the device 2000.

In S1403, the installation managing unit 36 determines whether information of use status of applications is required in the application monitoring template. The case in which information of use status of applications is required includes, for example, a case in which "not used at all" or "not used for specific period" is selected as an option of the use status in FIG. 10B.

When information of use status of applications is required, the routine proceeds to S1404. On the other hand, when information of use status of applications is not required, the routine proceeds to S1103 of FIG. 16.

In S1404, the installation managing unit 36 acquires use information of applications from the device 2000 selected in the task to be executed.

Specifically, in S1404, the installation managing unit 36 transmits a request for acquisition of use information of applications to the device 2000 (713 in FIG. 8). When the request for acquisition of use information is received, the application managing unit 43 of the device 2000 returns use information indicating the use status of applications to the device management server 1000 (714 in FIG. 8).

Accordingly, the installation managing unit 36 can acquire use information of applications installed in the device 2000. Thereafter, the routine proceeds to S1103 of FIG. 16.

This concludes the description of the operation at the time of execution of a task according to the first embodiment. The processes of 710 to 717 in FIG. 8 are realized by the operation.

In the first embodiment, the task managing unit 33 of the device management server 1000 creates a task for monitoring operations of applications in the device 2000 (S1201 to S1205). When the task is executed, the installation managing unit 36 of the device management server 1000 acquires the application information and the resource information from the device 2000 (S1401 and S1402). When the acquired resource information satisfies predetermined conditions (YES in S1103), an instruction on processing of a second type of application is executed.

Accordingly, display of a warning (S1105) or uninstallation of an application (S1106) is performed according to the monitoring condition at the time of execution of a task based on the application monitoring template. The operation states of the applications installed in the device 2000 or the resources of the device 2000 are appropriately managed through these processes.

Second Embodiment

In a second embodiment, a configuration for limiting a type of an application to be uninstalled when an application monitoring template is used will be described below.

In the following description of the second embodiment and embodiments subsequent thereto, the same device constituents or display screens as in the first embodiment will be referred to by the same reference signs and description thereof will not be repeated.

Figure 18C:
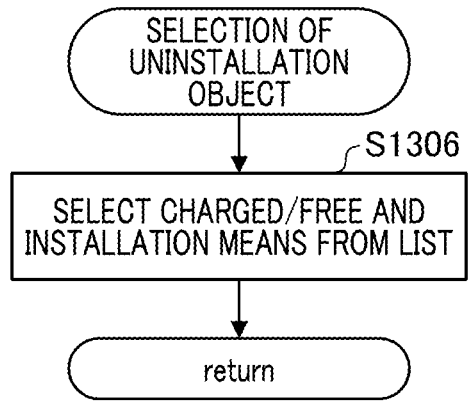

The operations for creating a template in the second embodiment are performed in accordance with the flowchart illustrated in FIG. 15 similarly to the first embodiment. In the second embodiment, as the process of S1303 in FIG. 18A which is a subroutine of S1009, S1306 illustrated in FIG. 18C is performed instead of S305 illustrated in FIG. 18B.

In S1306, the template managing unit 321 receives an input for selecting a type of an application to be uninstalled from a user, for example, via the template creation screen illustrated in FIG. 12. Options of the type of an application to be uninstalled include, for example, "charged/free application," "installation means," and "all applications." In the option of "installation means," an application installed from the device management system and an application installed from a device panel can be selected.

Here, it is assumed that "free application" is selected as the type of an application to be uninstalled.

When the process of S1306 ends, the routine proceeds to S1304 in FIG. 18A and then the application monitoring template is stored in S1010 in FIG. 15.

In the second embodiment, similarly to the first embodiment, creation of a task is performed in the routine illustrated in FIG. 17 and execution of a task is performed in the routine illustrated in FIG. 16.

In the routine illustrated in FIG. 16 according to the second embodiment, when the monitoring condition of the task to be executed is satisfied (YES in S1103), an uninstallation process is performed in accordance with the settings (S1106). At this time, when "manual" is selected in selection of deletion of an application (FIG. 11), the installation managing unit 36 receives an input for selecting an application to be uninstalled from a user via the UI. At this time, for example, an uninstallation application selection screen illustrated in FIG. 21 is displayed by the installation managing unit 36.

Figure 21:
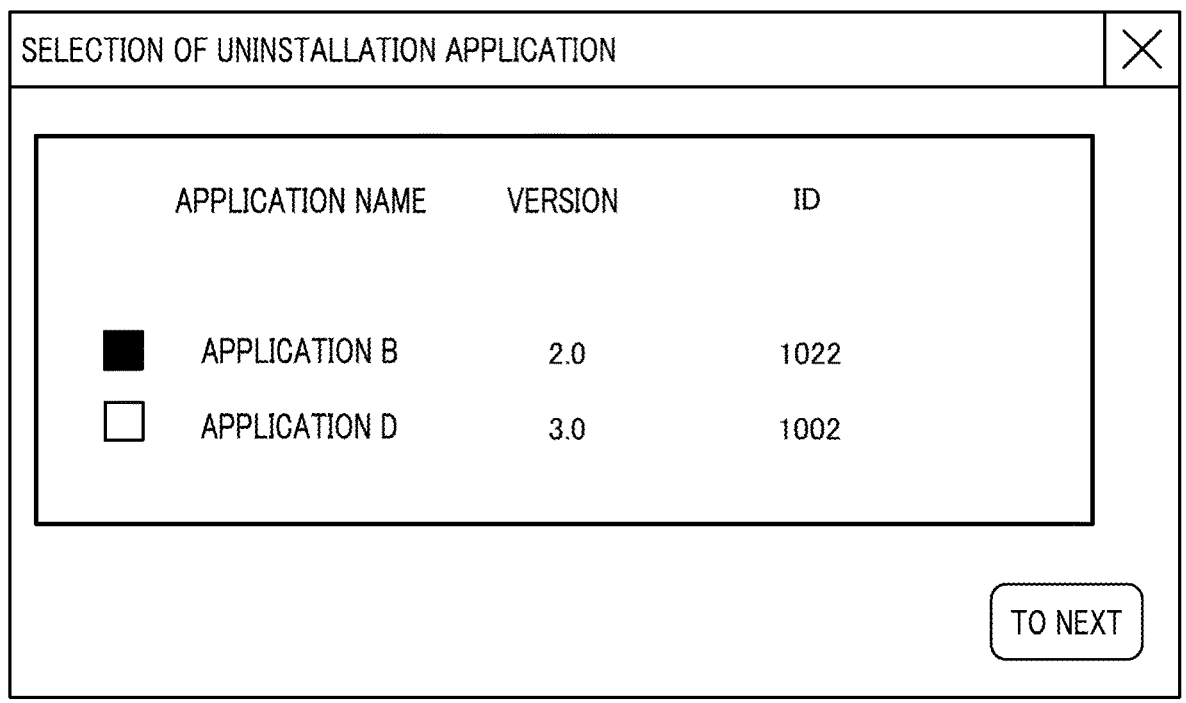
FIG. 21 is a diagram illustrating a display example of the uninstallation application selection screen.

In FIG. 21, with the selection in S1306, free applications B and D are displayed as names of applications which can be uninstalled in a list in correlation with versions and IDs. Whether an application is free or charged is determined, for example, on the basis of the application information acquired in S1402, but may be determined using another method.

The installation managing unit 36 determines an application which is selected on the screen illustrated in FIG. 21 by a user as an uninstallation object. Here, it is assumed that application B is selected as an uninstallation object.

According to the second embodiment, when the acquired resource information satisfies predetermined conditions (YES in S1103), it is possible to instruct a free application to be selectively uninstalled from the device 2000. Accordingly, by deleting an application with a relatively low degree of importance when a resource capacity of the device 2000 is small, it is possible to appropriately manage operation states of applications installed in the device 2000 or resources of the device 2000.

Third Embodiment

In a third embodiment, a configuration for performing uninstallation of an application at a user's desired timing when an application monitoring template is used will be described below.

The operations for creating a template in the third embodiment are performed in accordance with the flowchart illustrated in FIG. 15 similarly to the first embodiment. In the third embodiment, the routine illustrated in FIG. 18D is performed instead of FIG. 18A which is a subroutine of S1009.

Figure 18D:
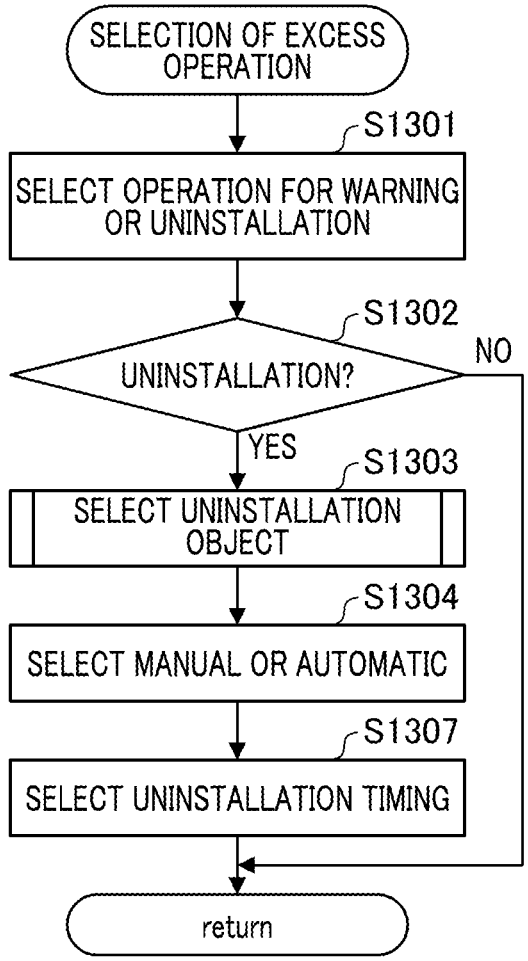

The routine illustrated in FIG. 18D is the same as the routine illustrated in FIG. 18A except that the process of S1307 is performed after the process of S1304 in FIG. 18A. Accordingly, in the following description with reference to FIG. 18D, description of all the same steps as in FIG. 18A will be omitted.

In S1307, the template managing unit 321 receives an input for selecting a timing of uninstallation of an application from a user, for example, via the template creation screen illustrated in FIG. 13. Options of the timing of uninstallation include, for example, "immediately," "when device is shut down," "designated date and time." When the process of S1307 ends, the routine proceeds to S1010 in FIG. 15.

In the third embodiment, similarly to the first embodiment, creation of a task is performed in the routine illustrated in FIG. 17 and execution of a task is performed in the routine illustrated in FIG. 16.

In the routine illustrated in FIG. 16 according to the third embodiment, when the monitoring condition of the task to be executed is satisfied (YES in S1103), an uninstallation process is performed in accordance with the settings (S106). At this time, the installation managing unit 36 designates the timing of uninstallation and transmits a request for deletion of an application to the device 2000. Then, the device 2000 performs deletion of an application when the timing designated by the request for deletion has come.

According to the third embodiment, when the acquired resource information satisfies predetermined conditions (YES in S1103), it is possible to instruct on uninstallation of the second type of application in the image processing device is executed from the device 2000 at a set timing. Accordingly, it is possible to perform an uninstallation process, for example, in a timeline in which a user does not use the device 2000 and to improve convenience for a user who uses the device 2000.

Fourth Embodiment

In a fourth embodiment, a configuration for performing uninstallation when an application monitoring template is used and a charged application purchased for a period has expired will be described below.

In the fourth embodiment, similarly to the first embodiment, creation of a template is performed in accordance with the routine illustrated in FIG. 15 and creation of a task is performed in accordance with the routine illustrated in FIG. 17.

The operations for executing a task in the fourth embodiment are performed in accordance with the flowchart illustrated in FIG. 16 similarly to the first embodiment. In the fourth embodiment, the routine illustrated in FIG. 19B is performed instead of FIG. 19A which is a subroutine of S1102.

Figure 19B:
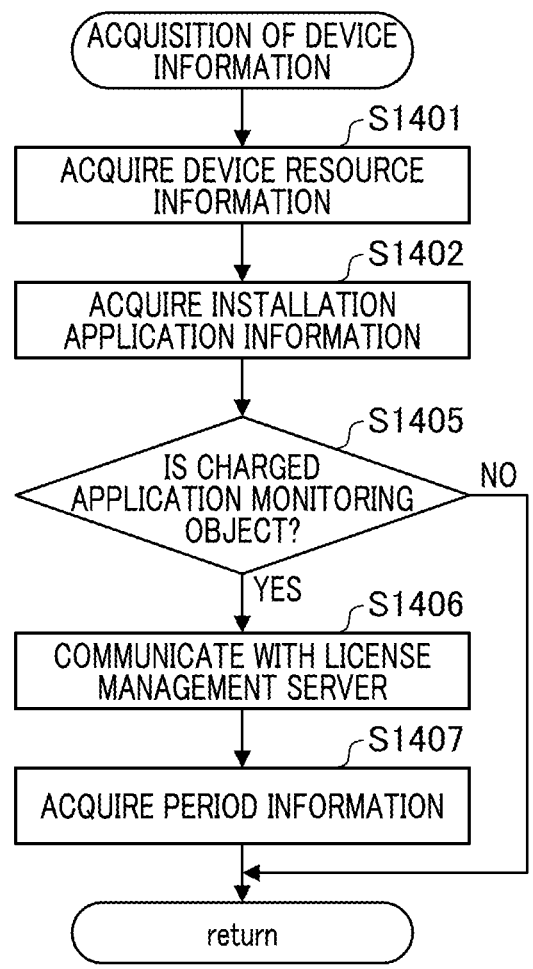

In the routine illustrated in FIG. 19B, the processes of S1405 to S1407 are performed after the process of S1402 in FIG. 19A. Accordingly, in the following description with reference to FIG. 19B, description of all of the same steps as in FIG. 19A will not be repeated.

In S1402, it is assumed that information of applications A, B, C, and D is acquired as application information and applications A and C are charged applications.

In S1405, the installation managing unit 36 determines whether the charged applications are to be monitored in the application monitoring template. For example, the installation managing unit 36 determines that the charged applications are to be monitored unless only the free applications are designated as an uninstallation object.

When the charged applications are to be monitored, the routine proceeds to S1406. On the other hand, when the charged applications are not to be monitored, the routine proceeds to S1103 of FIG. 16.

In S1406, the installation managing unit 36 communicates with the license management server 4002 of the software management system 4000 in order to acquire period information indicating an expiration date of a license of each charged application.

In S1407, the installation managing unit 36 acquires period information of the charged applications from the license management server 4002. When the current date and time is outside of the expiration date, the installation managing unit 36 determines that the charged application has expired. Thereafter, the routine proceeds to S1103 of FIG. 16.

In this example, period information of applications A and C is acquired in S1407. Here, it is assumed that application A has not expired and application C has expired.

When it is determined in S1103 of the fourth embodiment that the monitoring condition of the task to be executed is satisfied (YES in S1103), the uninstallation process is performed in accordance with the settings (S1106). At this time, when "manual" is selected in selection of deletion of an application (FIG. 11), the installation managing unit 36 receives an input for selecting an application to be uninstalled from a user via the UI. At this time, for example, an uninstallation application selection screen illustrated in FIG. 22 is displayed by the installation managing unit 36.

In FIG. 22, free applications B and D and application C which has expired are displayed as names of applications which can be uninstalled in a list in correlation with versions and IDs.

The installation managing unit 36 determines an application which is selected on the screen illustrated in FIG. 22 by a user as an uninstallation object. Here, it is assumed that application C is selected as an uninstallation object. The installation managing unit 36 may uninstall charged application C which has expired regardless of an input for selection from a user.

According to the fourth embodiment, when the acquired resource information satisfies predetermined conditions (YES in S1103), it is possible to instruct an application which has expired to be selectively uninstalled from the device 2000. Accordingly, by deleting an application with a relatively low degree of importance when a resource capacity of the device 2000 is small, it is possible to appropriately manage operation states of applications installed in the device 2000 or resources of the device 2000.

Other Embodiments

In the process of S1103 of the aforementioned embodiment, when information on the application satisfies the monitoring condition of the task, the task managing unit 33 may dynamically create a task which is different from the task under execution in accordance with an instruction from the installation managing unit 36. For example, the task managing unit 33 defines a processing instruction on a second type of application (an uninstallation instruction or warning) and creates a task for immediately executing the instruction. The installation managing unit 36 may perform an uninstallation process or a warning display process in the device 2000 on the basis of the dynamically created task.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-24616, filed Feb. 17, 2020, which is hereby incorporated by reference wherein in its entirety.

What is claimed is:

1. A management device that manages an image processing device via a network, the image processing device being configured to install a first type of application delivered from the management device and a second type of application different from the first type, the management device comprising:

a memory storing instructions; and
a processor executing the instructions to:
acquire application information for each of one or more applications installed in the image processing device;

create a task for monitoring the image processing device; and
acquire resource information on resources required for using an application in the image processing device in accordance with the created task;
set a processing target selectively for the first type of application and the second type of application that installed using different installation means included in one or more applications installed on the image processing device; and
execute, in a state where a selection corresponding to the second type application is set as the processing target, an instruction on processing of the second type of application included in the one or more applications installed in the image processing device when the acquired resource information satisfies predetermined conditions.

2. The management device according to claim 1, wherein the instruction on processing of the second type of application is executed in accordance with the created task when the acquired resource information satisfies predetermined conditions.

3. The management device according to claim 1, wherein:
the processor executes the instructions to further additionally create another task for defining the instruction on processing of the second type of application when the acquired resource information satisfies predetermined conditions, and
the instruction on processing of the second type of application is executed in accordance with the created another task.

4. The management device according to claim 2, wherein a process defined by the task is for executing an instruction on uninstallation of the second type of application in the image processing device.

5. The management device according to claim 3, wherein a process defined by the task is for executing an instruction on uninstallation of the second type of application in the image processing device.

6. The management device according to claim 1, wherein the second type of application has been installed in the image processing device on the basis of an instruction from an operation unit of the image processing device.

7. The management device according to claim 6, wherein the second type of application includes a free application.

8. The management device according to claim 7, wherein the instruction on processing the second type of application executes an instruction on uninstallation of the free application of the second type of application in the image processing device when the acquired resource information satisfies the predetermined conditions.

9. The management device according to claim 1, wherein the instruction on processing the second type of application executes an instruction on uninstallation of an expired application of the second type of application in the image processing device when the acquired resource information satisfies the predetermined conditions.

10. The management device according to claim 1, wherein the instruction on processing the second type of application executes an instruction on uninstallation of the second type of application in the image processing device at a set timing when the acquired resource information satisfies predetermined conditions.

11. A method that is performed by a management device managing an image processing device via a network, the image processing device of being configured to install a first type of application delivered from the management device and a second type of application of a type different from the first type, the method comprising:
acquiring application information for each of one or more applications installed in the image processing device;
creating a task for monitoring the image processing device; and
acquiring resource information on resources required for using an application in the image processing device in accordance with the created task;
setting a processing target selectively for the first type of application and the second type of application that installed using different installation means included in one or more applications installed on the image processing device; and
executing, in a state where a selection corresponding to the second type application is set as the processing target, an instruction on processing of the second type of application included in the one or more applications installed in the image processing device when the acquired resource information satisfies predetermined conditions.

12. A non-transitory storage medium storing a computer program executable by a computer of a management device that manages an image processing device via a network, the image processing device being configured to install a first type of application delivered from the management device and a second type of application of a type different from the first type, to execute a method comprising:
acquiring application information for each of one or more applications installed in the image processing device;
creating a task for monitoring the image processing device; and
acquiring resource information on resources required for using an application in the image processing device in accordance with the created task;
setting a processing target selectively for the first type of application and the second type of application that installed using different installation means included in one or more applications installed on the image processing device; and
execute, in a state where a selection corresponding to the second type application is set as the processing target, an instruction on processing of the second type of application included in the one or more applications installed in the image processing device when the acquired resource information satisfies predetermined conditions.

* * * * *